United States Patent [19]
Campbell

[11] Patent Number: 5,163,585
[45] Date of Patent: Nov. 17, 1992

[54] PUNCTURING DEVICE FOR AEROSOL CONTAINERS

[76] Inventor: Michael Campbell, 1400 N. Woodhouse Rd., Virginia Beach, Va. 23454

[21] Appl. No.: 687,760

[22] Filed: Apr. 19, 1991

[51] Int. Cl.⁵ .............................................. B67B 7/24
[52] U.S. Cl. ......................................... 222/5; 30/448; 141/65; 141/329; 414/412
[58] Field of Search ...................... 222/4, 5, 80, 81, 83, 222/83.5, 87, 88; 30/366, 448; 141/65, 329, 330; 414/412

[56] References Cited

U.S. PATENT DOCUMENTS

| | | | |
|---|---|---|---|
| 3,303,968 | 2/1967 | Compére | 222/82 |
| 3,333,735 | 8/1967 | Odasso | 222/5 |
| 3,828,976 | 8/1974 | Sidelinker | 222/83.5 |
| 3,926,340 | 12/1975 | Tygenhof | 222/83.5 |
| 4,349,054 | 9/1982 | Chipman et al. | 222/87 X |
| 4,407,341 | 10/1983 | Feldt et al. | 222/87 X |
| 4,459,906 | 7/1984 | Cound et al. | 222/87 X |
| 4,500,015 | 2/1985 | Penney | 222/87 X |
| 4,934,055 | 6/1990 | Chambers | 222/80 X |
| 5,067,529 | 11/1991 | Gonzalez-Miller et al. | 141/329 X |
| 5,086,814 | 2/1992 | Sato et al. | 222/83.5 X |

FOREIGN PATENT DOCUMENTS

| | | | |
|---|---|---|---|
| 1607991 | 10/1970 | Fed. Rep. of Germany | 141/65 |
| 0821399 | 4/1981 | U.S.S.R. | 222/83 |

Primary Examiner—Robert P. Olszewski
Assistant Examiner—Edward M. Wacyra

[57] ABSTRACT

A puncturing device for relieving the pressure in pressurized containers and allowing the collection of the released gases and residual contents by providing a generally bottle-shaped housing member for receiving a pressurized container in an inverted position, the housing being adapted at its lower end for attachment to a collection container and having an aperture to permit entrance of a puncturing device. A second flat member is provided for slidably engaging the upward facing end of the pressurized container to force the pressurized container downward within the housing member against a resilient beveled shoulder secured therein to create a seal, an angular third member with a puncturing device at the lower end thereof and attachment to a pivot point for moving the third member relative to the housing member for puncturing the pressurized container therein by forcing the puncturing device through the aperture in the housing member and into the pressurized container.

16 Claims, 3 Drawing Sheets

PUNCTURING DEVICE FOR AEROSOL CONTAINERS

BACKGROUND

1. Field of Invention

This invention relates to puncturing devices for aerosol containers or other pressurized containers, specifically to such puncturing devices that are used to relieve the pressure of residual gas within a pressurized container and for releasing for collection the residual contents within a pressurized container.

2. Description of Prior Art

Aerosol containers and other like pressurized containers have widespread usage in homes and industry. A safety hazard exists when disposing of such containers. Exposure to excessive heat can cause the containers to explode. Crushing such containers without first relieving the pressure can cause an explosion. An environmental hazard exists when disposing of such containers. The Environmental Protection Agency (EPA), an agency of the U.S. Government, regulates the disposal of the contents of a plurality of such containers as hazardous waste. These regulations mandate that certain businesses and industries dispose of the contents of such containers according to EPA guidelines. Regardless of whether the contents of such containers are regulated as hazardous waste, the EPA mandates that all pressurized containers be punctured prior to disposal.

Depending upon the nature of the contents, such disposal method can be permanent disposal, through incineration, landfill or other means; it can be treatment, through a process which neutralizes hazardous material, rendering it harmless; it can be recycling, a process which allows the contents to be utilized again for its original purpose; or it can be reclaimed, whereby the contents can be utilized again for a new purpose. An example of reclamation would be recovering the solvent contained in waste paint for use as a fuel. Whichever hazardous waste disposal method is used, the EPA requires that such disposal occur at a permitted facility and that all pressurized containers be relieved of pressure prior to being transported for disposal.

Due to increased environmental awareness, many private citizens and small businesses not required to follow the EPA regulations referenced above have a desire to dispose of the hazardous contents of such containers in a manner which provides personal safety and protects the environment.

Heretofore, inventors have created puncturing devices for the purpose of relieving the pressure within pressurized containers. U.S. Pat. No. 3,303,968 to Compere (1967) discloses a tool which resembles a pair of pliers with curved jaws. Centrally located on the inward curve of one of the jaws is a puncturing device. The puncturing device has as a component a deflector located on the outward curve of the jaw for the purpose of dissipating into the atmosphere the gas emitted from the pressurized container subsequent to being punctured. However, the Compere device does not have the means of collecting the gas being dissipated and does not facilitate the release of the residual contents of the container. Continual repetitive usage of the device could strain or cramp the user's hand, as the ergonomics involved in its operation are more appropriate for occasional usage.

U.S. Pat. No. 3,333,735 to Odasa (1967) discloses a device which encloses an inverted container. The puncturing device is activated by lever means to puncture the upward facing bottom of the enclosed pressurized container. The Odasa puncturing device has conduit means to vent the gases released during the puncture operation into the atmosphere. Unlike the present invention, the device is designed to minimize or eliminate the release of the residual contents of the pressurized container. By positioning the puncturing device at the topmost portion of the inverted container, the gases which rise to the top will be released. Residual contents can not be released as they will remain at the bottom of the inverted container.

The Odasa device has no means of collection. At the time of its invention, environmental law did not mandate the puncturing of pressurized containers prior to disposal. Therefore, the need for a puncturing device which could be used repeatedly, safely, and in an area such as an industrial workplace where the uncontrolled release of residual gases could pose safety and environmental problems did not commonly exist. In addition, the contents of a plurality of pressurized containers were not regulated as hazardous waste and/or not recyclable in a cost-efficient manner. Thus, there was no useful purpose for collecting the residual contents and no requirement to do so. Current technology, spurred by environmental concerns, provides effective means to recycle/reclaim many of these wastes.

Thus, the puncturing devices for pressurized containers heretofore known suffer from a number of disadvantages:

a. Because they are designed to puncture the uppermost portion of a container, the puncturing operation releases gases but very little of the residual contents.

b. They allow gases to be released directly into the atmosphere.

c. When used in an industrial workplace, such as a manufacturing facility or refinery, the released gases pose a fire hazard when exposed to sparks.

d. The devices have no means of collection of gases or residual contents.

e. The devices have no means of attachment to a collection container.

f. Because the devices in present use do not have means of collection or attachment to a collection device, the devices do not address current environmental concerns regarding increasing the amount of hazardous waste that is recycled/reclaimed.

g. Because the devices in present use do not have means of collection or attachment to a collection device, there is no provision for consolidating the residual contents of several pressurized containers into one larger container in order to decrease the ultimate cost of disposal.

OBJECTS AND ADVANTAGES

Accordingly, several objects and advantages of the present invention are:

a. To provide a new and improved puncturing device for relieving the pressure in empty pressurized containers.

b. To provide a new and improved puncturing device for relieving the pressure in empty pressurized containers in a safe and efficient manner.

c. To provide a new and improved puncturing device for relieving the pressure in empty pressurized containers in a manner which complies with EPA regulations.

d. To provide a new and improved puncturing device for relieving the pressure in empty pressurized containers which can be adapted to attach to a wide range of collection containers.

e. To provide a new and improved puncturing device for relieving the pressure in empty pressurized containers in a manner which allows the release of the pressure and collection of the residual contents.

f. To provide a new and improved puncturing device for relieving the pressure in empty pressurized containers in a manner which prevents the expulsion into the atmosphere of the released gases and residual contents.

g. To provide a new and improved puncturing device for relieving the pressure in empty pressurized containers which will facilitate the collection of the residual contents in bulk.

h. To provide a new and improved puncturing device for relieving the pressure in empty pressurized containers which can accommodate pressurized containers in a wide range of sizes.

Further objects and advantages of this invention will become apparent from a consideration of the ensuing description and drawings.

DRAWING FIGURES

Figure 1:
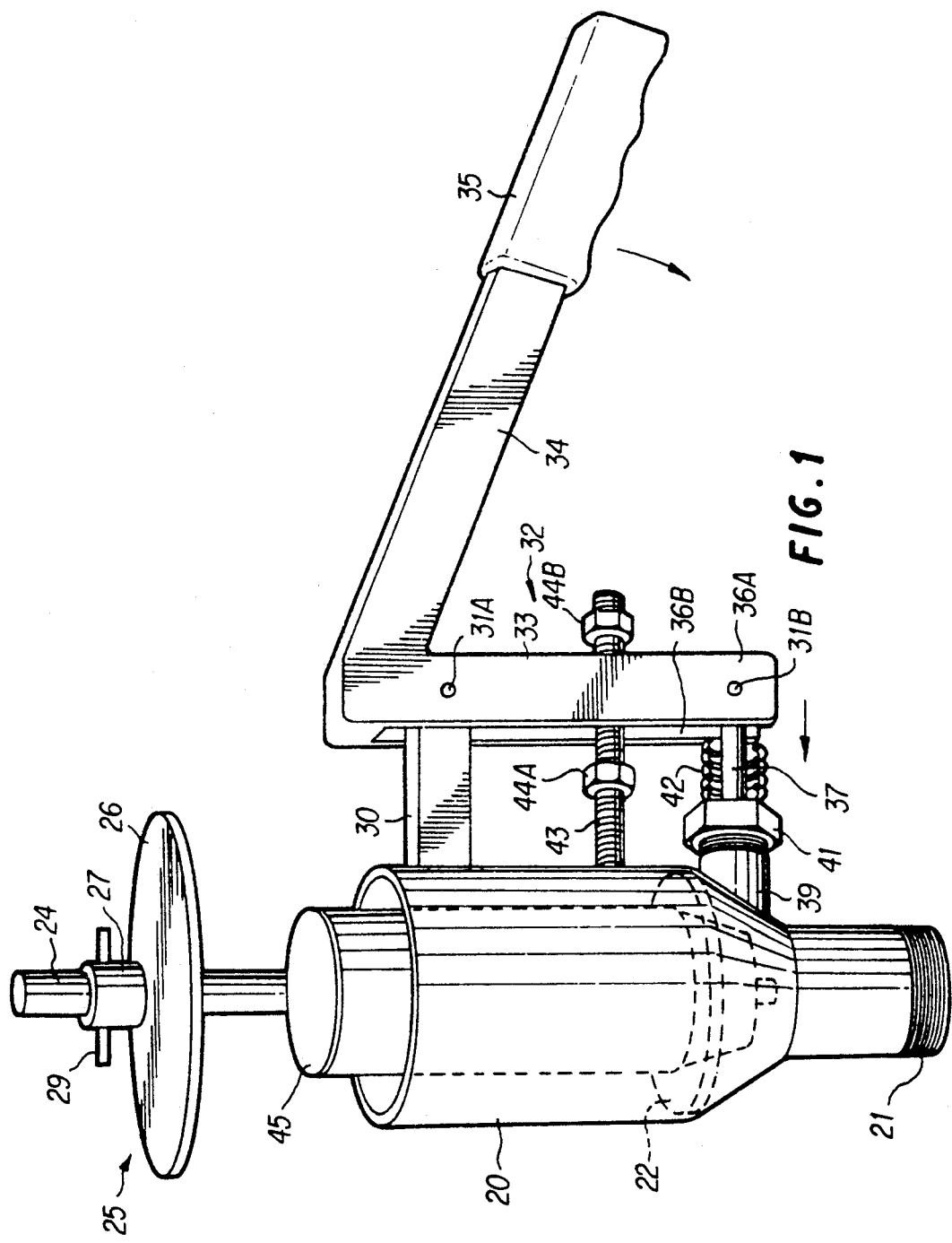
FIG. 1 shows the present invention in perspective from what is the front view when operated by a right-handed individual.

| REFERENCE NUMERALS IN DRAWINGS | | | |
|---|---|---|---|
| 20 | housing member | 21 | threaded terminus |
| 22 | beveled shoulder | 23 | stack holder |
| 24 | stack | 25 | sliding plate |
| 26 | flat base member | 27 | vertical member |
| 28 | threaded hole | 29 | tee handle |
| 30 | joining member | 31A | pivot point |
| 31B | pivot point | 32 | lever or handle |
| 33 | upright portion of handle | 34 | gripping end of handle |
| 35 | grip | 36A | handle upright wall |
| 36B | handle upright wall | 37 | puncture pin |
| 38 | opening | 39 | threaded sleeve |
| 40 | packing material | 41 | threaded plug |
| 42 | spring | 43 | threaded rod |
| 44A | nut | 44B | nut |
| 45 | pressurized container | | |

DECRIPTION

Referring now to the drawing in FIG. 1, there is shown a housing member 20 which is of substantially bottle shape, being open at both ends, having as its lower end a threaded terminus 21. Threaded terminus 21 is typically of a dimension and thread size to allow easy attachment to a threaded bung of a 55 gallon drum or other like collection container. Housing 20 may be made of steel or any other material of sufficient strength to withstand the maximum force expected during the operation of the invention.

Within the interior of housing 20 at a predetermined distance from threaded terminus 21 is a beveled shoulder 22, circular in configuration and affixed to the internal circumference of housing 20. Beveled shoulder 22 can be made of rubber or urethane or any other material of sufficient resilience and water-tightness to create a seal when force is applied to an inverted pressurized container positioned within housing 20.

Figure 2:
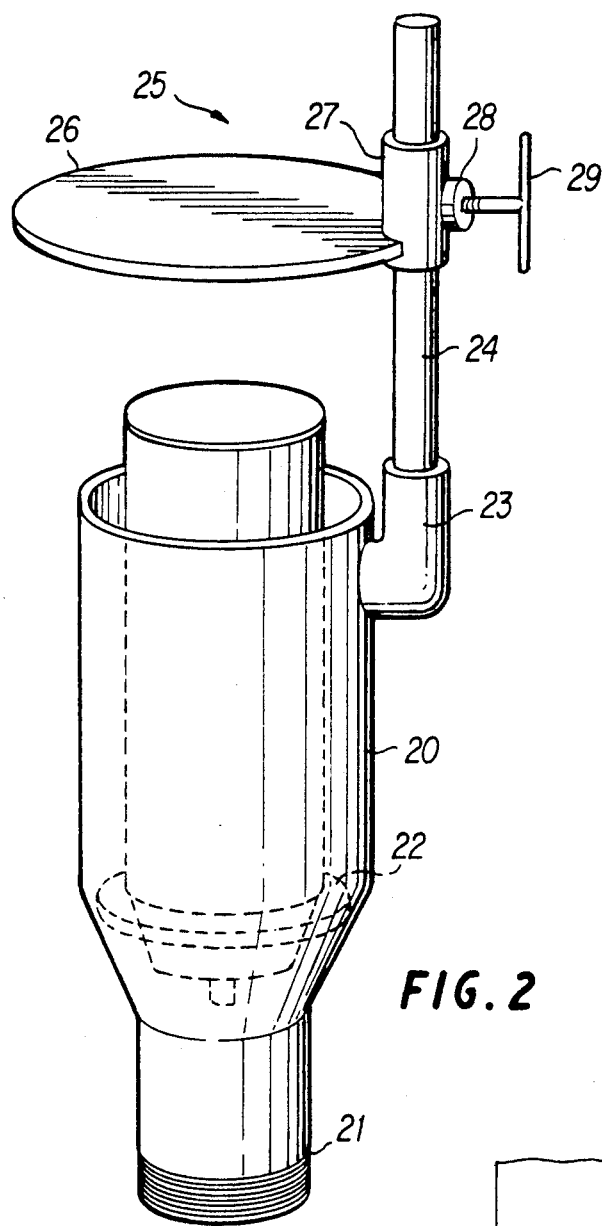
FIG. 2 shows the present invention in perspective from the side view, giving detail of the sliding plate.

Secured to the external upper portion of housing 20, as shown in FIG. 2, is a stack holder 23 of cylindrical configuration and of a depth and diameter adequate to support an upwardly extending stack 24. Stack 24 is a solid rod of steel or similar material of sufficient strength to withstand the maximum force expected when engaging a sliding plate 25. Plate 25 can be made of a material similar to housing 20. Plate 25 has a flat base member 26 of substantially round configuration and a hollow vertical member 27 of cylindrical shape, the inner surfaces of which engage in close mating relationship to the circumference of stack 24 in slidable relation therewith. Positioned on vertical member 27 midway between its upper and lower edge and at a location approximately opposite from flat base 26 is a threaded hole 28. A tee handle 29 suitably threaded to engage by screw means hole 28 is provided to allow plate 25 to be firmly positioned at any location along stack 24; stack 24 being of a predetermined length to accommodate the use of plate 25 to forcefully engage inverted pressurized containers of various heights against shoulder 22 within housing 20.

In FIG. 1 there is shown a horizontally extending joining member 30 secured at one end to the upper external edge of housing 20, a predetermined distance from stack holder 23. At the other end of joining member 30, which is of generally rectangular configuration, there is located an aperture for a pivot point 31A. A lever or handle 32 is pivotally secured to joining member 30 by means of insertion of a roll pin, or the like, through the aperture of joining member 30 at pivot point 31A. Handle 32 is of angular configuration having a generally upright portion 33 and a gripping end 34 which slopes at an acute angle from upright 33. Handle 32 can be made of steel or any other similar material of sufficient strength to withstand the maximum force expected during the operation of the invention.

Gripping end 34 is fitted with a grip 35 which can be made of polyvinyl chloride or a similar material of sufficient resilience to provide cushioning to the hand and of sufficient maleability to be shaped ergonomically. Upright 33 comprises two parallel walls 36A and 36B, each being of generally rectangular configuration, extending downward a predetermined distance relative to the position of shoulder 22. The distance between the inner surfaces of walls 36A and 36B is nominally greater than the thickness of joining member 30 to optimize the pivot action of handle 32.

Generally disposed between walls 36A and 36B at the lower ends thereof is a puncture pin 37 having an aperture for a pivot point 31B. The lower end of upright 33 is pivotally secured to puncture pin 37 at pivot point 31B. Puncture pin 37 is of generally cylindrical shape with a tapered end to provide puncturing means when forcefully engaged against the downward facing end of an inverted pressurized container 45 positioned atop shoulder 22 within housing 20. Puncture pin 37 can be made of steel or any other similar material of sufficient strength to withstand the maximum force expected during the operation of the invention.

Figure 3:
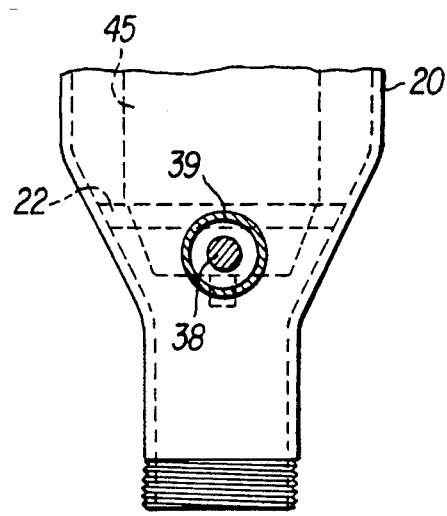
FIG. 3 shows a partial elevation of the housing member, providing a view of the aperture through which the puncture pin travels.
Figure 3A:
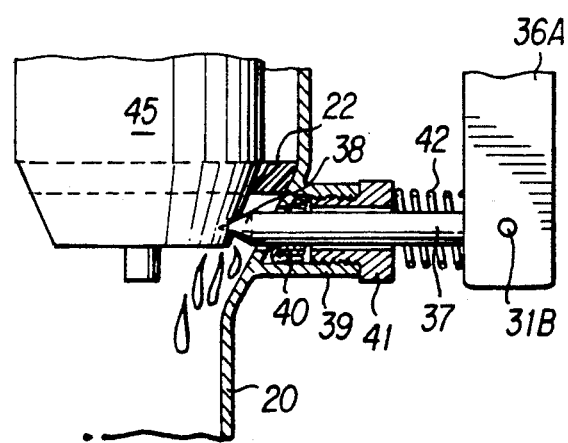
FIG. 3A shows a detail in section of the puncture pin as it appears during operation of the present invention.

Located on housing 20 at a predetermined distance below shoulder 22 is an aperture 38, as shown in FIG. 3, of a diameter to provide the minimum clearance necessary for the insertion of puncture pin 37. Engaged along the external surface of housing 20 and encircling aperture 38 is an internally threaded sleeve 39 of generally cylindrical configuration which protrudes a predetermined distance from housing 20. Located within sleeve 39 is a replaceable packing material 40. To provide the least resistance to the sliding action of puncture pin 37, packing material 40 preferably consists of braided Teflon-brand PTFE; Teflon is a trademark of E. I. DuPont de Nemours & Co., Inc., Wilmington, DE.

A plug 41, suitably threaded to engage by screw means sleeve 39 is provided to allow packing material 40 to be readily replaceable. Plug 41 has an internal bore of sufficient minimum diameter to allow puncture pin 37 to slidably engage therein. The external end of plug 41 is of hexagonal shape to facilitate removal with a simple hand tool. Encircling puncture pin 37 is a spring 42 which in its relaxed position is adjacent to plug 41 at one end and adjacent to the facing edges of walls 36A and 36B of upright 33 at the other end.

Secured to housing 20 at a distance approximately intermediate of sleeve 40 and joining member 30 is a threaded rod 43, made of steel or any other similar material of sufficient strength to withstand the maximum force expected during the operation of the invention. A nut 44A, suitably threaded to engage threaded rod 43, is provided. Nut 44A is disposed in a position on threaded rod 43 between upright 33 and the external surface of housing 20 to allow adjustment to the pivot action of upright 33. A nut 44B suitably threaded to engage threaded rod 43, is provided. Nut 44B is disposed on threaded rod 43 external of the outward facing edges of walls 36A and 36B of upright 33 to limit the outward pivot action of upright 33.

OPERATION

In operation, housing 20 is secured at threaded terminus 21 to a threaded opening of a 55 gallon drum or similar collection container. A pressurized container 45 is inserted into housing 20 in an inverted position so that the top of container 45 rests on shoulder 22. Tee handle 29 is loosened and plate 25 is lowered slidably along stack 24 to a position which applies force to the upward-facing bottom of container 45 to firmly engage inverted container 45 against shoulder 22 within housing 20. Tee handle 29 is then tightened to secure plate 25 in the engaged position.

Handle 32 is grasped by hand at grip 35 and downward pressure is applied. Handle 32 pivots at pivot point 31A where walls 36A and 36B enclose joining member 30. The pivot action causes the lower end of upright 33 to exert lateral force against puncture pin 37 at pivot point 31B. The force exerted against puncture pin 37 is tempered by spring 42 as puncture pin 37 passes through plug 41 and sleeve 39, then aperture 38, and pierces the inverted top of container 45, as shown in FIG. 3. The gases and residual contents within container 45 then escape downward through the bottom of housing 20 into the collection container.

By puncturing the inverted container 45 adjacent the downwardly facing end, the residual contents as well as the gases will be released. The force of gravity combined with the pressure released in conjunction with the expulsion of the gases and residual contents of container 45 facilitate the downward flow of the residual contents and gases expelled.

Furthermore, shoulder 22 and packing material 40 provide a seal during the puncturing operation. During the puncturing operation spring 42 is compressed by the lower ends of walls 36A and 36B against plug 41. As handle 32 is raised after puncturing and collection has occurred, spring 42 is relaxed. Concurrently, puncture pin 37 disengages from its position within container 45. The outward motion of upright 33 resulting from raising handle 32 is restricted by nut 44B to prevent puncture pin 37 disengaging further than is necessary to facilitate removal of container 45.

Nut 44A can be adjusted to halt the inward thrust of upright 41 as it forces puncture pin 37 against container 45. This feature allows the user to minimize the exertion required during the puncturing operation when multiple containers of a similar size require puncturing.

Figure 4:
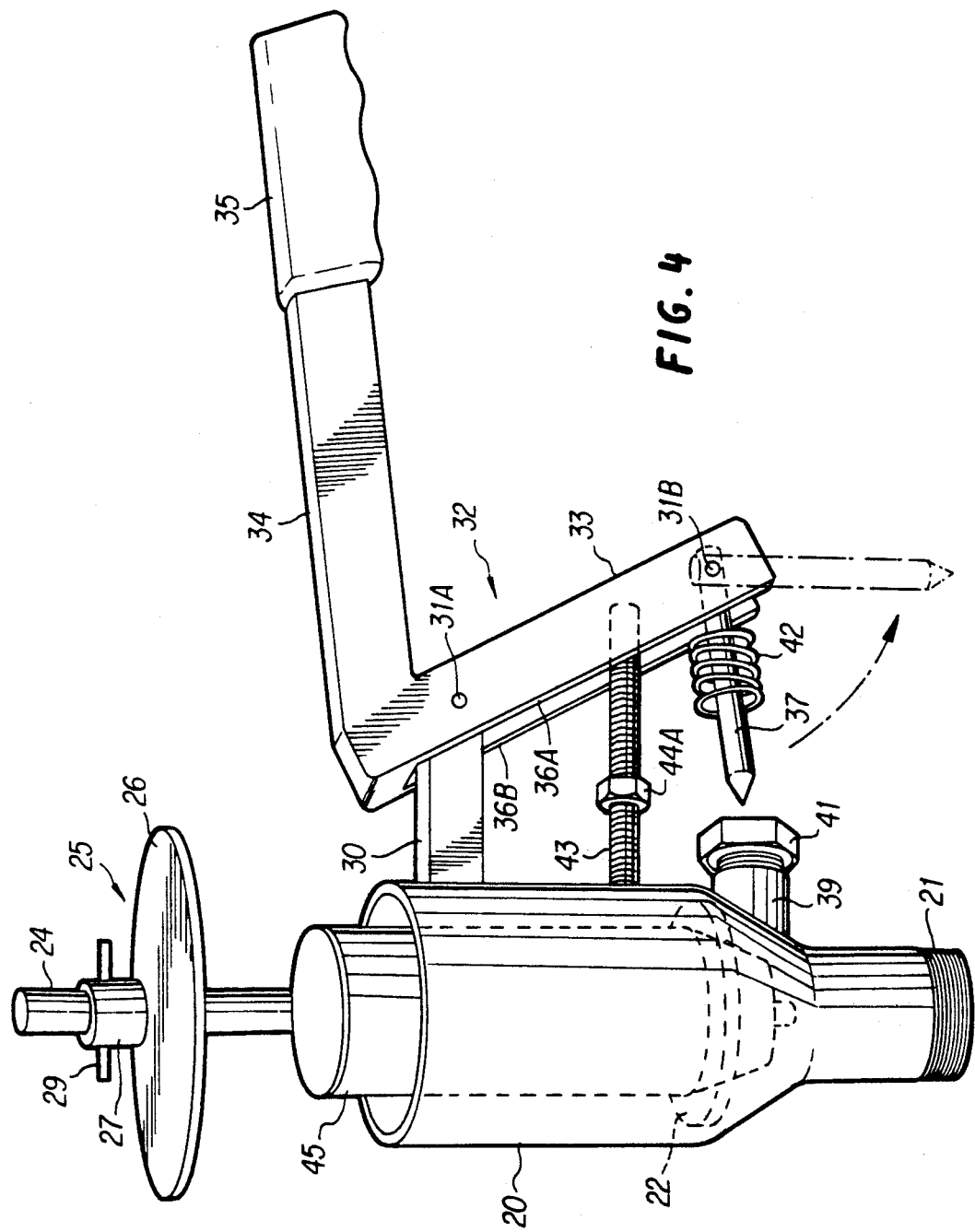
FIG. 4 shows the present invention when handle is at its upmost position and puncture pin is removed.

Packing material 40 can be easily removed and replaced as necessary, as shown in FIG. 4. By removing nut 44B and raising handle 32, the upward motion of upright 33 disengages puncture pin 37 from within sleeve 39 and plug 41. Plug 41 is then unscrewed, providing access to packing material 40. Once packing material 40 is replaced within sleeve 39, plug 41 is inserted by screw means, forcing packing material 40 against housing 20 disposed around the circumference of the external surface of aperture 38.

Furthermore, puncture pin 37 can be easily replaced or removed for resharpening by removing the attachment means at pivot point 31B.

SUMMARY, RAMIFICATIONS AND SCOPE

Accordingly, the reader will see that the puncturing device of this invention can be used to puncture pressurized containers safely, easily, and conveniently. Furthermore, the puncturing device has the additional advantages that it can easily attach to a collection container it allows the collection of the residual contents and released gases into a collection container it facilitates compliance with EPA regulations in industrial workplaces it allows the residual contents to be collected in bulk, facilitating economical disposal, treatment, recycling or reclamation.

it can accommodate pressurized containers in a wide range of sizes it permits easy replacement of parts, such as the puncture pin and packing material.

Although the description above contains many specificities, these should not be construed as limiting the scope of the invention, but as merely providing illustrations of some of the presently preferred embodiments of this invention. It is to be understood that various other modifications and adaptations can be readily made without departing from the scope of the invention.

As is obvious, the dimensions of the puncturing device can be varied to accommodate any size pressurized container. Furthermore, threaded terminus 21 can be varied in dimension to facilitate attachment to containers other than 55 gallon drums as described. The device can be made of the materials previously described, or other materials such as plastics, the main requirement being sufficient strength to withstand the force exerted in operation and sufficient imperviousness to the residual contents being released from the pressurized containers being emptied.

An O-ring or similar object can be used in place of packing material 40 to provide a seal. Attachment means of handle 32 at pivot point 31A can be adapted to be easily detachable, as with a bolt and a butterfly nut, whereby handle 32 can be easily attached and detached to several housings 20 located on different collection containers.

Thus the scope of the invention should be determined by the appended claims and their legal equivalents, rather than by the examples given.

I claim:

1. A device for puncturing pressurized containers for relieving the pressure therein and for releasing for collection the gases and residual contents thereof, said device comprising:
   a. a generally bottle-shaped, first member adapted for receiving an inverted pressurized container at least partially therein, said first member having an aperture at a predetermined location;
   b. attachment means for securing said first member to a receptacle or container for collecting expelled contents thereof;
   c. a generally flat, second member with adjustment means to provide slidable downward engagement against the upmost portion of said inverted pressurized container within said first member;
   d. means for attaching said second member to said first member for effecting the engagement of said second member;
   e. a third, generally angular member with puncturing means for piercing said pressurized container;
   f. means for mounting said angular member for movement relative to said first member for effecting the piercing of said inverted container through said aperture in said first member.

2. A device according to claim 1 wherein said first member comprises a threaded terminus at the lower end thereof, said threaded terminus providing attachment means to one of a variety of collection containers.

3. A device according to claim 1 wherein an interior circumference of said first member defines a shoulder means, said first member being adapted for receiving in said interior circumference the pressurized container in an inverted position upon said shoulder means.

4. A device according to claim 3 wherein said shoulder means comprises a polyurethane or similar fluid-tight, resilient material, and is of such size to prevent passage of the inverted pressurized container resting thereon.

5. A device according to claim 1 wherein said first member has at its external upper portion a vertically extending body, said vertically extending body being of cylindrical configuration and adapted for receiving said second member.

6. A device according to claim 1 wherein said second member has a flat portion of generally circular configuration being of a diameter at least as great as the diameter of the interior circumference of said first member, said second member having attachment means disposed adjacent one edge of said flat portion.

7. A device according to claim 6 wherein said attachment means comprises a hollow body and a handle, the inner diameter of said hollow body approximating the outer diameter of said vertically extending body for slidable engagement therewith.

8. A device according to claim 7 wherein said hollow body has a threaded hole disposed on the side of said hollow body opposite the side adjacent said edge of said flat portion, said hole being of a diameter and thread size to provide attachment by screw means of said handle.

9. A device according to claim 1 wherein said angular member has a generally upright portion and a gripping end extending outward at an acute angle to said upright portion.

10. A device according to claim 9 wherein said gripping end is adapted with a grip, said grip being made of a material and shape to provide cushioning means.

11. A device according to claim 1 wherein said puncturing means has a tapered end adapted for piercing the pressurized container, said puncturing means being adapted for detachment from said angular member to effect the replacement thereof.

12. A device according to claim 11 wherein spring means are provided which encircles said puncturing means, said spring means being adapted for restraining the movement of the puncturing means during operation thereof and for effecting the disengagement of said puncturing means thereafter.

13. A device according to claim 1 wherein said first member has an outwardly extending enclosure of generally cylindrical shape, said enclosure adjacent and surrounding said aperture and providing fluid-tightness means for preventing the discharge of gases and residual contents from said first member.

14. A device according to claim 1 wherein adjustment means are provided, said adjustment means being secured at one end to said first member, with a free end thereof communicating with said angular member for effecting the force of engagement of said puncturing means.

15. A device according to claim 14 wherein said adjustment means includes attachment and detachment means by providing a nut, said nut being adapted for effecting the attachment and detachment of said angular member.

16. A device according to claim 1 wherein said second member has attachment means to said first member, said second member being slidable and rotatable.

* * * * *